United States Patent
Nakanishi et al.

(10) Patent No.: US 8,297,668 B2
(45) Date of Patent: Oct. 30, 2012

(54) IMPACT ABSORBING MEMBER FOR VEHICLE

(75) Inventors: Makoto Nakanishi, Toyota (JP); Mitsutoshi Kano, Toyota (JP)

(73) Assignee: Toyoda Iron Works Co., Ltd., Toyota-shi, Aichi-ken (JP)

(*) Notice: Subject to any disclaimer, the term of this patent is extended or adjusted under 35 U.S.C. 154(b) by 166 days.

(21) Appl. No.: 12/654,294

(22) Filed: Dec. 16, 2009

(65) Prior Publication Data
US 2010/0164238 A1    Jul. 1, 2010

(30) Foreign Application Priority Data
Dec. 26, 2008  (JP) ................ 2008-331911

(51) Int. Cl.
  *B60R 19/20*  (2006.01)
  *B60R 19/34*  (2006.01)
(52) U.S. Cl. ........................ 293/132; 293/133
(58) Field of Classification Search ............ 293/132, 293/133, 120, 155, 122, 109, 121, 136, 154; 296/197.09, 203.02, 187.08, 187.03, 187.01; B60R 19/34, 19/20
See application file for complete search history.

(56) References Cited

U.S. PATENT DOCUMENTS

| | | | | |
|---|---|---|---|---|
| 3,134,585 A * | 5/1964 | Trask | | 267/153 |
| 4,413,856 A * | 11/1983 | McMahan et al. | | 296/187.03 |
| 6,270,131 B1 * | 8/2001 | Martinez et al. | | 293/132 |
| 6,705,653 B2 * | 3/2004 | Gotanda et al. | | 293/132 |
| 7,070,217 B2 * | 7/2006 | Longo | | 293/132 |
| 7,252,314 B2 * | 8/2007 | Tamura et al. | | 293/133 |
| 2002/0063433 A1 * | 5/2002 | Gotanda et al. | | 293/132 |
| 2002/0167183 A1 * | 11/2002 | Shimotsu et al. | | 293/132 |
| 2005/0062300 A1 * | 3/2005 | Toneatti et al. | | 293/133 |
| 2007/0114804 A1 * | 5/2007 | Gross et al. | | 293/132 |

FOREIGN PATENT DOCUMENTS

| | | |
|---|---|---|
| JP | 2002-155981 | 5/2002 |
| WO | WO 2005/010398 | 2/2005 |

* cited by examiner

*Primary Examiner* — Glenn Dayoan
*Assistant Examiner* — Sunsurraye Westbrook
(74) *Attorney, Agent, or Firm* — Finnegan, Henderson, Farabow, Garrett & Dunner, LLP

(57) ABSTRACT

Flanges (68) are provided on outer sides (in an upper-lower direction) of a pair of narrow side walls (66) of a crash box (50). Each of flanges (68) is provided to be connected to the narrow side wall (66) at the central portion thereof, and the both lateral portions thereof (wing-like flanges (70a, 70b)) extend parallel to the narrow side walls (66) and in the opposite directions relative to each other. Therefore, even when an impact load is applied to the crash box (50) in an oblique direction of the vehicle, owing to disposition of the flanges (68) the crush box (50) is suppressed from lateral falling, so that excellent impact-absorbing property is stably obtained. Because the flanges (68) are formed parallel to the narrow side walls (66), the impact absorbing member can be appropriately prevented from the lateral falling resulted from the impact load acting in an oblique direction of the vehicle, and can be compactified in size. As a result, mountability on a vehicle is improved.

8 Claims, 9 Drawing Sheets

CONVENTIONAL PRODUCT

COMPARATIVE PRODUCT

INVENTED PRODUCT

AXIAL COLLAPSE LOAD

ABSORBED ENERGY

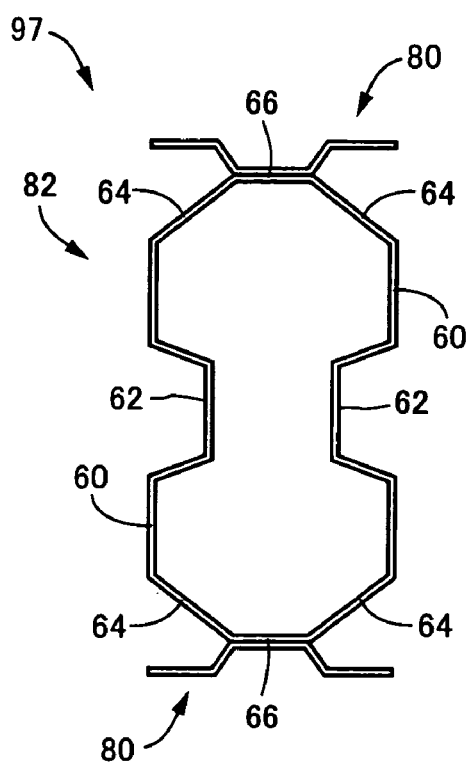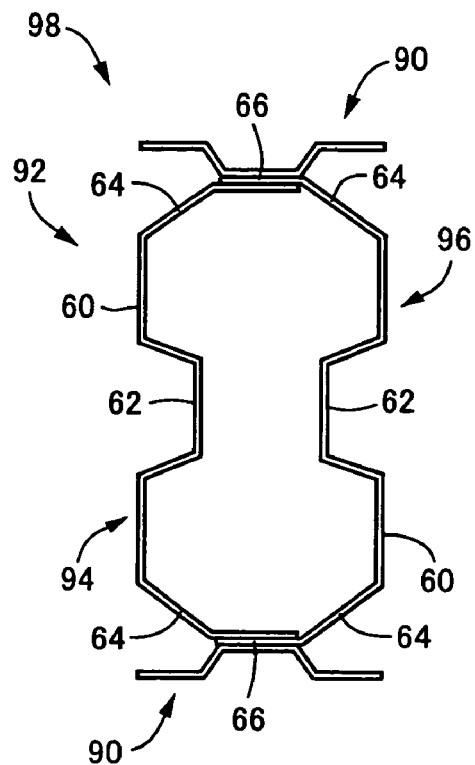

40% OFFSET RIGID BARRIER

40% OFFSET MOVING BARRIER

IMPACT ABSORBING MEMBER FOR VEHICLE

This application is based on Japanese Application No. 2008-331911 filed on Dec. 26, 2008, and content there of is incorporated therein for reference.

BACKGROUND OF THE INVENTION

1. Field of the Invention

The present invention relates to an impact absorbing member for a vehicle. More specifically, the invention relates to the impact absorbing member which hardly falls laterally when it receives an impact load from a front or back of a vehicle obliquely, and which is prevented from impairment of impact absorbing performance.

2. Description of the Related Art

An impact absorbing member for a vehicle is mounted to a frond end portion or the like of a vehicle to absorb an impact load applied to the vehicle. One example thereof is an impact absorbing member having a tubular body portion with a closed section formed of a plurality of plate-like side walls. Some of the plurality of side walls are formed a concave groove(s) which is recessed inwardly of the tubular body portion and which extends parallel to an axial direction thereof. This impact absorbing member is disposed between a vehicle body side member and a bumper member such that the axial direction thereof is directed in a fore and aft direction of the vehicle. When the impact absorbing member receives a compressive load, it collapses like bellows axially to absorb the impact energy (see, e.g., Patent Document 1: WO 2005/010398).

FIGS. 6A and 6B are drawings explaining one example of such impact absorbing member for vehicle. FIG. 6A is a schematic plan view showing a bumper beam 10 of a vehicle front side and vicinity thereof, as viewed from an upper side of a vehicle. Right and left side members 12R and 12L are provided with crash boxes 14R and 14L, as the impact absorbing members, respectively at front ends thereof. The bumper beam 10 is fixed at right and left ends thereof to the crash boxes 14R and 14L. FIG. 6B is a section along a line VIA-VIA in FIG. 6A, that is a section view near a right mounting portion. The crash box 14R includes a main body portion 20 having a tubular shape and a pair of mounting plates 22 and 24 integrally weld-fixed to both ends of the main body portion 20 in the axial direction, respectively. The crash box 14R is fixed to the side member 12R and the bumper beam 10 via the mounting plates 22 and 24 with a bolt (not illustrated) or the like.

FIGS. 7A and 7B are drawings specifically explaining one example of the main body portion 20 of the crash box 14R, in which FIG. 7A is a perspective view, and FIG. 7B is a front view. A section (corresponding to FIG. 7B) perpendicular to the axial direction of the main body portion 20 has an elongated shape (in FIG. 7B, flat octagonal shape elongated in an upper-lower direction) as a basic shape, which has a pair of parallel long sides each obtained by linearly interpolating two sides adjacent to a concave groove 32. A pair of wide side walls 30 constituting the long sides of the basic shape are each provided with, at an intermediate portion (a central portion in FIG. 7) in the width direction thereof, i.e., the upper-lower direction in FIG. 7A and FIG. 7B, concave grooves 32 which are recessed inward of the main body portion 20 and extend parallel to the axial direction respectively. The crush box 14R is disposed between the side member 12R and the bumper beam 10 such that the pair of the wide side walls 30 are spaced in the vehicle width direction. The main body portion 20, comprised of a polygonal tube with a closed section having a elongated shape in the upper-lower direction, is obtained by integrally weld-fixing a pair of press plates 26 and 28 bent into an M shape, with mutually superposing both side edges of one press plate on both side edges of the other press plate.

When this crash box 14R receives a compressive load F giving an impact on a front of the vehicle, the main body portion 20 collapses like bellows as shown in FIG. 6C. The crash box 14R absorbs by deformation thereof the impact energy to relieve the impact applied to structural members of the vehicle such as the side member 12R and the like. The bellows-like collapse (L-shaped folds in FIG. 6C) is a phenomenon in which the main body portion 20 is buckled continuously at multiple places. The collapse usually starts from a side of the bumper beam 10, i.e., an input side, and progresses toward a side of the vehicle body with time. The bumper beam 10 has left-right symmetrical shape, and a left mounting portion is similarly structured.

The bumper beam 10 functions as a reinforcement (reinforcing member) and a mounting member for a bumper, and a bumper main body 16 made of synthetic resin or the like is integrally mounted on the bumper beam 10. The bumper beam 10 corresponds to the bumper member, and the side members 12R and 12L correspond to the vehicle body side members, of the present invention.

By the way, in recent years, as a crash test for evaluation of damage on the vehicle, a test method is adopted in which an oblique barrier is used to assume collision of the vehicle in an oblique direction. According to a test shown in FIG. 8A, a vehicle is offset-collided at a predetermined vehicle speed V1 (e.g., 15 km/h) with a rigid barrier 42 having a crash surface 40 inclined at a predetermined angle θ1 (e.g., about 10°). According to a test shown in FIG. 8B, a crash cart 46 provided with a barrier 44 at its front end is collided at a predetermined speed V2 (e.g., 15 km/h) with a corner of a vehicle in a direction inclined at a predetermined angle θ2 (e.g., about 10°).

According to such test methods, for example, a load F is applied obliquely to the vehicle to generate a moment load M in the crash box 14R as shown in FIG. 9, and the crash box 14R tends to fall laterally toward an inner (center) side (a left direction in FIG. 9) of the vehicle. As a result, desired impact-energy absorbing performance of the crash box 14R may not be obtained.

To solve this problem, Patent Document 2 (JP2002-155981A) proposes an impact absorbing member for a vehicle having a tubular shape with a square closed section, in which concave grooves are not provided in the side walls, but flanges projecting radially outward from plate-like side walls or corners of the square closed section are provided.

Accordingly, applying the technology described in the Patent Document 2 to the impact absorbing member for the vehicle whose side walls are provided with the concave grooves described in the Patent Document 1 may be conceivable, which is however unknown yet. In this case, the flanges projecting radially outward are to be provided on corners or a flat parts of the side walls. With this, even when the impact load is applied to the impact absorbing member in the oblique direction of the vehicle, the impact absorbing member will be prevented from falling laterally, and can render a predetermined impact absorbing performance. However, due to disposition of the flanges projecting radially outward, the impact absorbing member occupies a large space in the vehicle to impair mountability thereof on the vehicle.

SUMMARY OF THE INVENTION

The present invention was accomplished considering the above situations, and has an object to provide an impact absorbing member for a vehicle which occupies the less mounting space in the vehicle as well as is prevented from falling laterally even upon application of the impact load in an oblique direction of the vehicle, so as have an excellent impact absorbing performance stably.

For achieving the above object, in a first aspect of the present invention, an impact absorbing member for a vehicle includes a tubular body portion with a closed section formed of a plurality of plate-like side walls, at least one of which is provided with at least one concave groove recessed inwardly and extended parallel to an axial direction of the tubular body portion, is disposed between a vehicle body side member and a bumper member in a posture such that the axial direction is directed in a fore and aft direction of the vehicle, and is collapsed like bellows axially upon receipt of a compressive load to absorb an impact energy.

The impact absorbing member comprises (i) reinforcing side walls respectively formed by a pair of parallel side walls which are other than the at least one side wall of the plurality of plate-like side walls provided with the at least one concave groove, and which are symmetrically located in the closed section, and (ii) flanges integrally formed on the tubular body portion over an entire axial length thereof respectively outside of the pair of reinforcing side walls. Each of the flanges includes, in a section perpendicular to the axial direction of the tubular body portion, a central portion and a pair of lateral portions, the central portion being connected to the reinforcing side wall, and the lateral portions projecting outward in directions away from the tubular body portion and being bent to spread substantially parallel to the reinforcing side wall in opposite directions, to form a concave groove-like shape as a whole having a bottom portion at a side of the reinforcing side wall outside of the tubular body portion.

For achieving the above object, in a second aspect of the present invention, an impact absorbing member for a vehicle includes a tubular body portion (tubular portion) with an closed section forming an elongate shape having a pair of parallel long sides, a pair of wide side walls forming the long sides being respectively provided with at least one concave groove recessed inwardly and extending parallel to an axial direction of the tubular body portion, is disposed between a vehicle body side member and a bumper member in a posture such that the axial direction thereof is directed in a fore and aft direction of the vehicle, and is collapsed like bellows axially upon receipt of a compressive load to absorb an impact energy.

The impact absorbing member comprises (i) reinforcing side walls formed by a pair of narrow side walls of the tubular body portion which are located in both end areas in a longitudinal direction of the closed section and are perpendicular to the longitudinal direction, and (ii) flanges integrally formed with the tubular body portion over an entire axial length thereof respectively outside of the pair of reinforcing side walls. Each of the flanges includes, in a section perpendicular to the axial direction of the tubular body portion, a central portion and a pair of lateral portions, the central portion being connected to the reinforcing side wall, and the lateral portions projecting outward in directions away from the tubular body portion and being bent to spread substantially parallel to the reinforcing side wall in opposite directions, to form a concave groove-like shape as a whole having a bottom portion at a side of the reinforcing side wall outside of the tubular body portion.

In a third aspect of the present invention, in the first or second aspect, in the section perpendicular to the axial direction of the tubular body portion, a width dimension between the both ends of each of the flanges is equal to or less than a width dimension between the outer surfaces of the tubular body portion in a direction parallel to each of the reinforcing side walls.

In a fourth aspect of the present invention, in one of the first to third aspects, the flanges are formed integrally with the tubular body portion, and the central portion of each of the flanges is shared by each of the reinforcing side walls of the tubular body portion.

In a fifth aspect of the present invention, in one of the first to fourth aspects, the impact absorbing member is disposed in a posture such that the pair of reinforcing side walls are located in both end areas in a vehicle upper-lower direction, and the reinforcing side walls and the flanges are substantially parallel to the vehicle width direction in the section perpendicular to the axis of the tubular body portion.

In the impact absorbing member for the vehicle according to the first aspect of the present invention, the flanges, respectively provided outside of a pair of reinforcing side walls of the tubular body portion integrally therewith, are each connected to each of the reinforcing side walls at the central portion thereof. The both lateral portions of each of the flanges project outward in directions away from the tubular body portion, and are bent so as to spread in opposite directions relative to each other substantially parallel (parallel or approximately parallel) to each of the reinforcing side walls, so that the concave groove-like shape as a whole, having a bottom portion at a side of the reinforcing side wall outside of the tubular body portion, is formed.

Accordingly, when the impact absorbing member is disposed such that the pair of reinforcing side walls are located at the both end areas in the vehicle upper-lower direction, and the reinforcing side walls and the flanges are substantially parallel (parallel or approximately parallel) to the vehicle width direction as in the fifth invention, even if the impact load applied in the oblique direction of the vehicle generates the moment load in the impact absorbing member, owing to disposition of the flanges the impact absorbing member is effectively suppressed from falling laterally, i.e., lateral falling, so that the excellent impact absorbing performance of the impact absorbing member can be stably obtained. In such a case, because the both lateral portions of each of the flanges are formed substantially parallel (parallel or approximately parallel) to the reinforcing side wall, the impact absorbing member can be compactified or miniaturized, compared with a case where flanges are provided so as to project radially outward, as well as it is suppressed from the lateral falling appropriately due to the impact load acting in the oblique direction of the vehicle. Accordingly, the mountability of the impact absorbing member on the vehicle can be increased.

In the impact absorbing member for the vehicle according to the second aspect of the present invention, the closed section of the tubular body portion has the elongated shape with the pair of long sides parallel to each other, and the narrow side walls located at the both end areas thereof in the longitudinal direction serve as the reinforcing side walls. Also in the second aspect, the flanges are provided outside of the pair of reinforcing side walls respectively likewise the first aspect, and the same function and effect as that of the first aspect can be obtained.

According to the third aspect of the present invention, the width dimension between the both ends of each of the flanges in the section perpendicular to the axial direction of the tubular body portion, is equal to or less than the width dimension between the outer surfaces of the tubular body portion in the direction parallel to the reinforcing side wall. Therefore, the width dimension of the impact absorbing member including the pair of flanges, that is, the dimension of the impact absorbing member in the vehicle width direction when the impact absorbing member is disposed as in the fifth aspect, can be maintained at the same magnitude as that of the conventional products. As a result, without impairing mountability on the vehicle, the impact absorbing member can be improved to be appropriately suppressed from the lateral falling due to the impact load acting in the oblique direction of the vehicle, and the impact absorbing performance thereof can be improved.

According to the fourth aspect of the present invention, each of the flanges is formed integrally with the tubular body portion so that the central portion thereof is shared with the reinforcing side wall. Therefore, the plate thickness of the reinforcing side wall of the tubular body portion can be selected or decided to be equal to that of other side walls, so that a decrease in the impact absorbing performance resulting from a local increase in the plate thickness can be suppressed. Moreover, the thickness of a part of reinforcing side wall where the central portion of the flange is connected, and the thickness of the both lateral portions of the flange branching off the reinforcing side wall to spread outward therefrom, can be selected or decided to be equal to the thickness of other side walls of the tubular body portion so as to maintain an excellent moldability when the tubular body portion and the flanges are molded or formed integrally by extrusion moldings or the like.

In the fifth aspect of the present invention, the impact absorbing member is disposed in the posture such that a pair of reinforcing side walls are located at the both end areas in the vehicle upper-lower direction, and the reinforcing side walls and the flanges are substantially parallel to the vehicle width direction. According to such arrangement, even when the impact load applied to the vehicle in the oblique direction thereof generates the moment load, the impact absorbing member is suppressed from lateral falling owing to disposition of the flanges, and can render the excellent impact absorbing performance stably.

BEST MODE FOR CARRYING OUT THE INVENTION

The impact absorbing member for the vehicle of the present invention can be applied to the mounting portions of the bumper members mounted on both the front side and the rear side of the vehicle, but may be applied to either one of them.

With respect to a shape of the bumper member in the longitudinal direction, that is, the shape in a planar view as seen from a position above the vehicle, for example, the front bumper member preferably has a smoothly curved shape with a central part projecting forward. However, various other modes are also adoptable, which includes for example, the bumper member may have substantially straight form, or only the both end portions of the bumper member may be inclined or curved backward. The impact absorbing member for the vehicle of the present invention is disposed in the posture such that the axial direction of the tubular body portion is directed in or coincided with the fore and aft direction of the vehicle. However, the axial direction does not have to be strictly coincident with the fore and aft direction of the vehicle, and the impact absorbing member can be disposed in the posture to be inclined in the left-right direction or upper-lower direction depending on the shape of the bumper member and the like.

The impact absorbing member for the vehicle of the present invention is constituted of the main body portion having for example a tubular shape (corresponding to a tubular body portion of the present invention), and the pair of mounting plates integrally fixed to the both axial ends of the main body portion. The section of the main body portion perpendicular to the axis of the tubular portion has, for example, an elongated polygonal shape of even polygonal which is quadrangular or more and is elongated in one direction. Further, in a pair of side walls providing mutually parallel two sides in the polygonal section, at least one concave groove(s) recessed inward is (are) formed. However, the sectional shape may be a simple regular polygon such as a square or a like, or may have a curved side formed by curved wall in arc-shaped or like at a part of a corner and the like.

The main body portion has a basic sectional shape of an elongated octagon (a shape formed by planing off four corners of a rectangle), for example. At substantially the central portions of the pair of long sides substantially parallel to the long axial direction of the section, the pair of concave grooves are respectively provided substantially symmetrically about the long axis. As a result, the main body portion has an 8-shaped or gourd-shaped section as a whole. Two or more concave grooves may be formed in each of the long sides.

The tubular portion of the main body portion is comprised of a pair of half pieces i.e. half parts. Each of the pair of half pieces is formed from a thin plate by press-work, for example, and has in the section a substantially M-shaped or like obtained by halving the main body portion in the direction substantially parallel to the axial direction. With the both side edges at the opening side of the one and the other half pieces being superposed or butted, the pair of half pieces are integrally weld-fixed to form the tubular portion. However, various other modes are adoptable, which include for example, hydraulically forming a tubular pipe member such as a cylindrical shape, square shape or the like to obtain a predetermined sectional shape of the tubular portion. In this case, the flanges formed by the press work or the like to have a convex shape as a whole, are integrally fixed to the predetermined reinforcing side walls of the main body portion by a welding, soldering, or the like.

The main body portion can be integrally formed with the flanges by the same member, as in the forth invention. For example, the main body portion may be integrally formed with the flanges using metal materials such as aluminum, aluminum alloy, or the like by an extrusion or the like.

In the case where the section of the tubular portion has the elongated shape, for example, one pair or plural pairs of the concave grooves provided on the side wall are formed substantially symmetrically about the center line (long axis) in the longitudinal direction of the elongated shape. However, the concave grooves are suitably formed depending on the sectional shape of the tubular portion or the like, which include for example forming a single concave groove, or forming a plurality of concave grooves about the axis of the tubular portion at predetermined intervals.

Each of the flanges has thickness substantially equal to that of the tubular portion, for example. The both lateral portions of the flange, for example laterally spaced in the width direction, projecting outward in the directions away, i.e., to be spaced from the reinforcing side wall, are bent so as to spread substantially parallel to the reinforcing side wall in the opposite directions. Inner side portions of each of the both lateral portions, projecting outward from the reinforcing side wall, may be provided perpendicularly to the reinforcing side wall for example, but they may be inclined obliquely in the directions away from the reinforcing side wall so as to expand like an inverted trapezoidal shape. Each of the both lateral portions may have a bended shape bent at right angle (L-shape) or at obtuse angle for example, or may have a smoothly bended curved shape.

According to the third aspect of the invention, in the direction parallel to each of the reinforcing side walls, the width dimension between the both ends of each of the flanges is selected to be equal to or less than the width dimension between the outer surfaces of the tubular portion. However, upon execution of other aspects of the invention, the width dimension between the both ends of each of the flanges may be selected to be larger than the width dimension between the outer surfaces of the tubular portion. In this case, in the direction parallel to the reinforcing side wall, the both ends of the flange project outward beyond the outer surfaces of the tubular portion.

According to the fourth aspect of the invention, in the case where the flanges are formed integrally with the tubular portion, when the reinforcing side wall is designed to have substantially equal thickness to that of other side walls, the central portion of the flange for example centrally located in the width direction, and the reinforcing side wall cannot be distinguished from each other. In view of this, the pair of wing-like flanges are provided to be spaced from each other at a predetermined interval corresponding to the width of the central portion in the section perpendicular to the axis. The wing-like flanges project outward from the reinforcing side wall, and are bent to spread substantially parallel to the reinforcing side wall in the opposite directions relative to each other. The pair of wing-like flanges and the reinforcing side wall connecting them constitute a convex-shaped flange.

The reinforcing side wall may have width dimension substantially equal to that between the both ends of each of the flanges. However, for example, in the section perpendicular to the axis of the tubular portion, the reinforcing side wall preferably has the width dimension substantially equal to that of the central portion of the flange. In this case, on the both sides of the reinforcing side wall, inclined side walls obliquely inclined in the opposite directions to the flange are provided. The inclined side walls are connected to adjacent side walls (wide side walls in the second aspect of the invention).

BRIEF DESCRIPTION OF THE DRAWINGS

FIGS. 1A to 1C are views explaining an impact absorbing member for a vehicle according to one embodiment of the present invention, in which FIG. 1A is a schematic plan view showing one example of disposing mode, FIG. 1B is a perspective view of a main body portion of the impact absorbing member for the vehicle, and FIG. 1C is a front view of the main body portion.

FIGS. 2A and 2B are views explaining application of a moment load on the impact absorbing member for the vehicle of FIG. 1, in which FIG. 2A shows a case where a crash surface is oblique, and FIG. 2B shows a case where the crash surface is perpendicular.

FIGS. 5A and 5B are views explaining other embodiment of the present invention, both showing a front view of a main body portion corresponding to FIG. 1C.

FIGS. 6A to 6C are views explaining a conventional impact absorbing member for a vehicle, in which FIG. 6A is a schematic plan view showing one example of specific arrangement mode, FIG. 6B is a VIA-VIA sectional view in FIG. 6A, and FIG. 6C is a view showing the conventional impact absorbing member for the vehicle collapsed like bellows due to a compressive load F.

FIGS. 7A and 7B are views showing a main body portion of the impact absorbing member for the vehicle of FIGS. 6A to 6C, in which FIG. 7A is a perspective view corresponding to FIG. 1B, and FIG. 7B is a front view corresponding to FIG. 1C.

PREFERRED EMBODIMENT

Hereafter, preferred embodiments of the present invention will be described in detail with reference to the drawings.

Figure 1A:
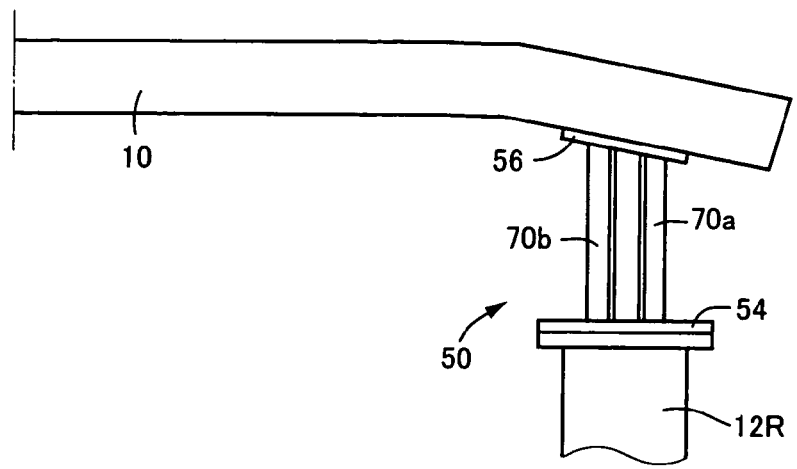
Figure 1B:
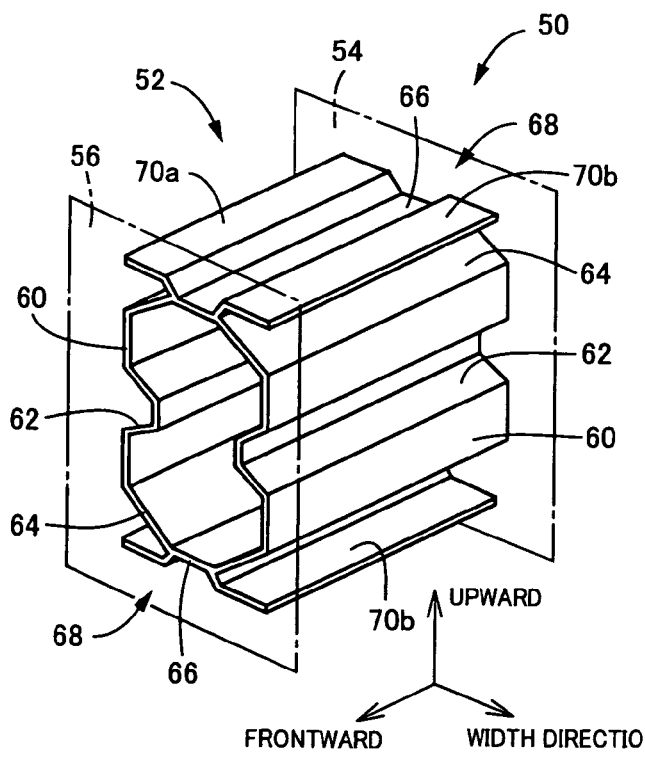
Figure 1C:
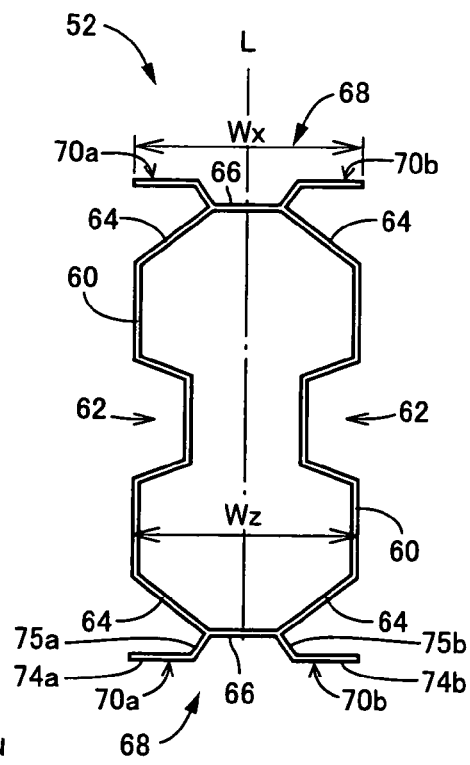
Figure 6A:
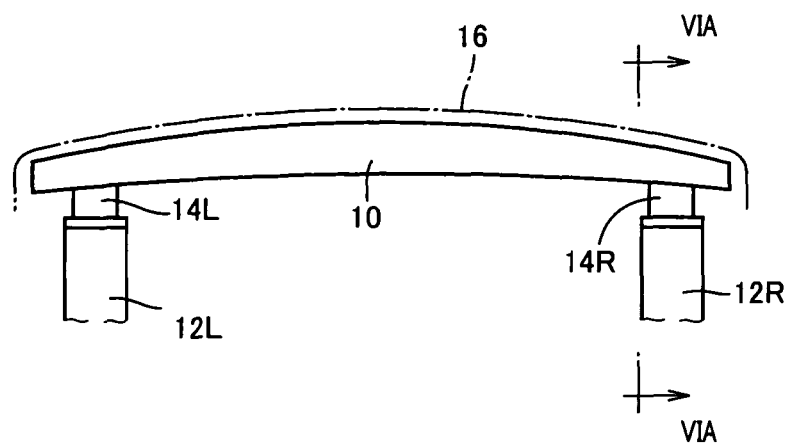
Figure 6B:
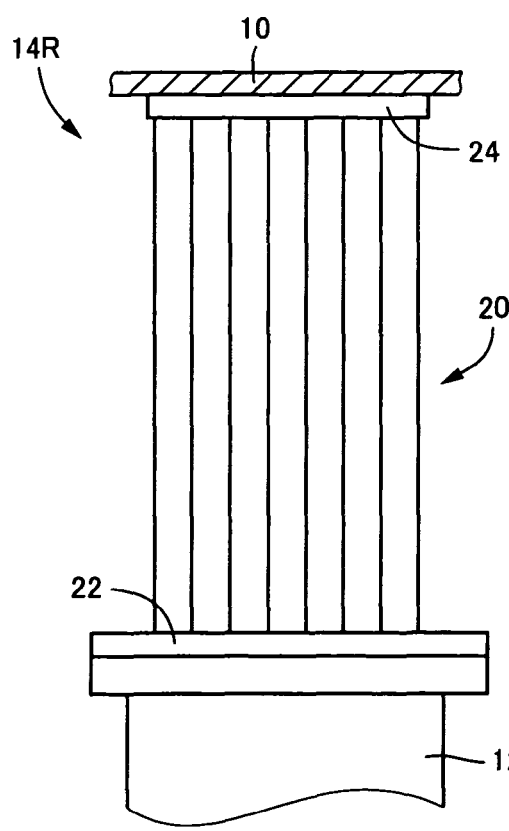
Figure 6C:
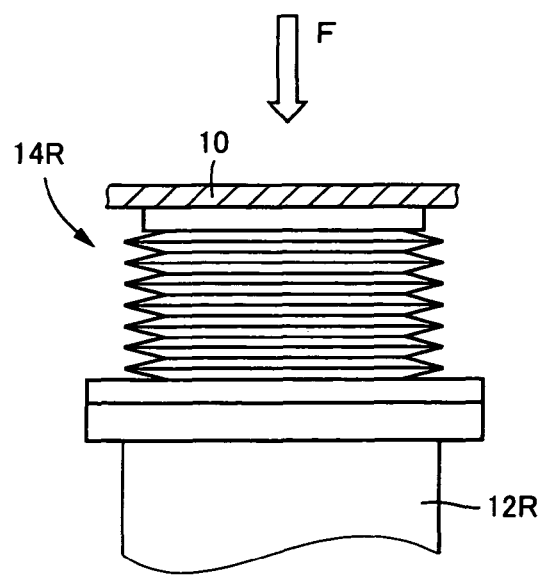

A crash box 50 in FIGS. 1A to 1C is disposed between the side member 12R and the bumper beam 10 to be used in place of the crash box 14R in FIGS. 6A to 6C, and corresponds to an impact absorbing member for a vehicle of the present invention. In FIG. 1A which is a plan view showing the right half of the vehicle, a left half is symmetrically constituted with the right half about a center line. The crash box 50 comprises a main body portion 52 having a tubular shape with a closed section of a flat octagon which is elongated in one direction as a basic sectional shape, and a pair of mounting plates 54 and 56 integrally weld-fixed to the both axial ends of the main body portion 52, respectively. The main body portion 52 corresponds to a tubular body portion of the present invention.

Figure 7A:
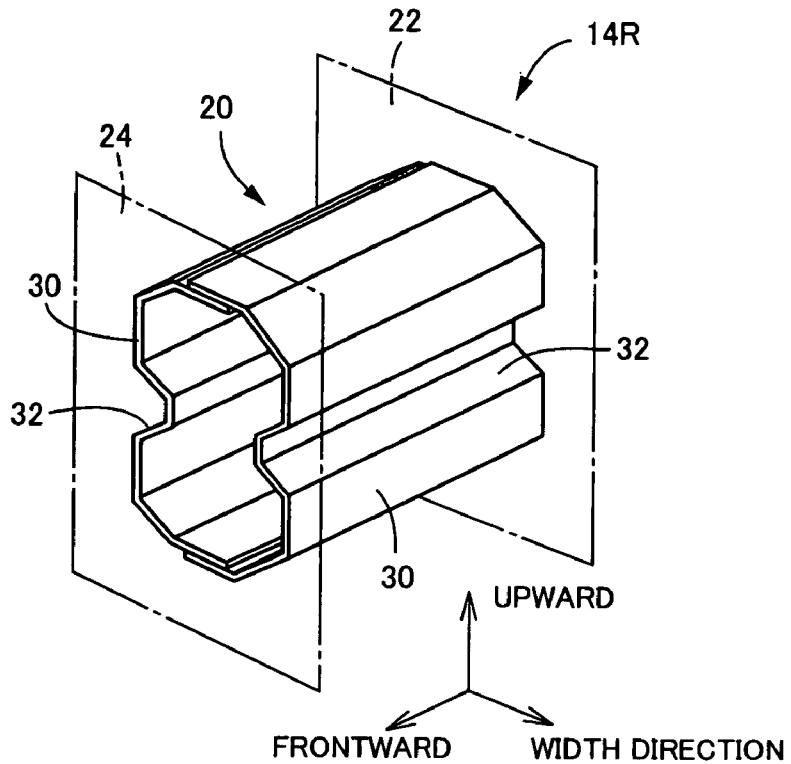
Figure 7B:
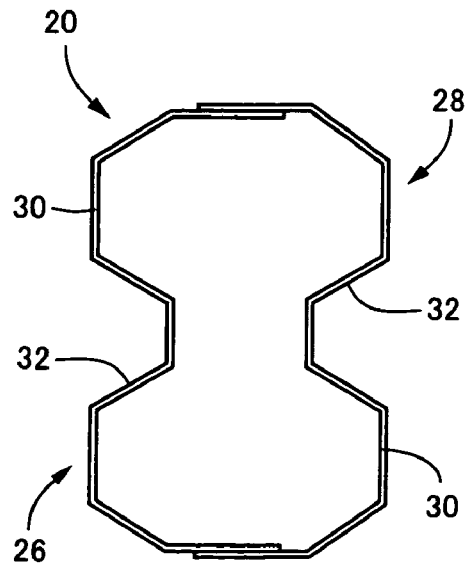

The crash box 50 is disposed between the side member 12R and the bumper beam 10 in a posture that an axis of the main body portion 52 is substantially parallel to a fore and aft direction of the vehicle, and it is integrally fixed to the side member 12R and the bumper beam 10 via mounting plates 54 and 56, with a bolt (not illustrated) or the like. FIG. 1B is a perspective view of the main body portion 52 and FIG. 1C is a front view viewed of the same in the axial direction correspond to FIG. 7A and FIG. 7B, respectively.

One axial edge on a side of the side member 12R, i.e., a side of the mounting plate 54 of both axial edges of the main body portion 52, is placed in a plane perpendicular to the axis of the main body portion 52. The mounting plate 54 is disposed substantially perpendicularly to the axis for a close adhesion at an entire periphery of the axial edge, to be fixed to the front edge of the side member 12R with adhering closely therewith.

Meanwhile, other axial edge of the main body portion 52 on a side of the bumper beam 10, i.e., a side of the other mounting plate 56, is inclined according to the shape of the bumper beam 10. That is, the other axial edge is inclined relative to the direction perpendicular to the axis of the main body portion 52 (fore and aft direction of the vehicle), so as to retreat toward the vehicle body as it goes to the end of the bumper beam 10. Further, the other mounting plate 56 is also disposed inclining to the axis of the main body portion 52 for a close adhesion at an entire periphery of the other axial edge, and is fixed to the bumper beam 10 with adhering closely therewith. The inclinational angle or inclination is set, depending on the shape of the bumper beam 10, in about 10° to about 15°, for example.

On receiving the compressive load resulted from the impact applied from a front of the vehicle, the crash box 50 collapses like bellows axially likewise the above-mentioned crash box 14R, as shown in FIG. 6C to absorb the impact energy by deformation at this time for relieving the impact applied to structural members of the vehicle such as the side member 12R and the like.

The main body portion 52 basically has the same shape as that of the main body portion 20. A section (corresponding to FIG. 1C) perpendicular to the axis (axial direction) of the tubular portion has an elongated shape as a basic shape, having a pair of parallel long sides each obtained by linear interpolation between two sides adjacent to a concave groove 62. Here, the elongated shape indicates an octagonal shape formed by planing off four corners of a rectangle elongated in the upper-lower direction, and the main body portion 52 has an 8-shaped or gourd-shaped section as a whole.

The main body portion 52 is provided with a pair of wide side walls 60, four inclined side walls 64, and a pair of narrow side walls 66. The pair of right and left wide side walls 60 parallel to each other form the long sides of the basic shape. The left-hand two (upper and lower) inclined side walls 64 and the right-hand two (upper and lower) inclined side walls 64 are provided so as to incline obliquely inward from the both ends of the wide side walls 60 respectively. The pair of narrow side walls 66 parallel each other, which correspond to reinforcing side walls of the present invention, form the short sides of the basic shape. The upper and lower narrow side walls 66 parallel each other are provided at the both ends (upper and lower ends) in the longitudinal direction of the basic shape, in a direction perpendicular to the longitudinal direction (i.e. in a left-right direction). The upper narrow side wall 66 connects the upper right and left inclined side walls 64, and the lower narrow side wall 66 connects the lower right and left inclined side walls 64.

At a central portion of each of the wide side walls 60 in the width direction, i.e., in the upper-lower direction (a long axis direction) in FIG. 1B and FIG. 1C, a concave groove 62 recessed inward of the tubular portion is formed substantially symmetrically about the long axis. A pair of concave grooves 62 extend over the entire length of the tubular portion parallel to the axial direction of the tubular portion. In each of the wide side walls 60, a plurality of concave grooves 62 can be formed spaced apart in the width direction (upper-lower direction in FIG. 1B and FIG. 1C).

The main body portion 52 is produced by an extrusion molding of an aluminum alloy. The wide side walls 60, the inclined side walls 64, and the pair of (upper and lower) narrow side walls 66 constructing the tubular portion with the closed section are formed in substantially the equal thickness. Outside of (in the upper-lower direction in FIG. 1B and FIG. 1C) the upper and lower narrow side walls 66, a pair of (an upper and a lower) flanges 68 are respectively provided integrally with the main body portion 52 having a tubular shape over the entire length thereof. In a section (corresponding to FIG. 1C) perpendicular to the axial direction of the main body portion 52, each of the flanges 68 includes one central portion and two lateral portions. The central portion is connected to the narrow side wall 66. The both lateral portions project outward (the upper-lower direction) in directions away from the tubular portion, and are bent so as to spread parallel to the narrow side wall 66 in the opposite directions (a left-right direction) relative to each other. As a result, each of the flanges 68 has a concave groove-like shape as a whole having a bottom at a side of the narrow side wall 66 outside of the tubular portion.

In the present embodiment, the main body portion 52 and the upper and lower flanges 68 are integrally formed in substantially the constant thickness by the extrusion molding of the aluminum alloy. The upper flange 68 will be explained fixed. The flange 68 is integrally formed with the main body portion 52, and the central portion of the flange 68 is shared with the narrow side wall 66. That is, the central portion of the flange 68 and the narrow side wall 66 can not be distinguished from each other, and the wing-like flanges 70a and 70b serving as the lateral portions are left-right symmetrically provided about the long axis to project outward (in the upper-lower direction) from the both (right and left) ends of the narrow side wall 66 serving as the central portion, and to spread parallel to the narrow side wall 66 in the opposite directions relative to each other. The wing-like flanges 70a and 70b and the narrow side wall 66 connecting the inner ends thereof constitute the flange 68 having convex shape or hat-like shape of low height as a whole.

The wing-like flanges 70a and 70b include a long portion 74a and 74b, and a short portion 75a and 75b, respectively. The long portions 74a and 74b extending in the left-right direction are provided as parallel portions parallel to the narrow side wall 66. The short portions 75a and 75b are connecting portions bent relative to the long portions 74a and 74b toward the narrow side wall 66 to be connected thereto. In the present embodiment, the short portions 75a and 75b are obliquely inclined to approach to each other toward the narrow side wall 66.

The width dimension between the both ends of the flange 68, that is the width dimension Wx between the both ends of the long portions 74a and 74b of the wing-like flanges 70a and 70b, is selected to be substantially equal to or smaller than the width dimension between the outer surfaces of the tubular portion in the direction parallel to the narrow side wall 66, that is the distance Wz between the right and left wide side wall portions 60. In the present embodiment, the width dimension of the both ends of the flange 68 is selected to be substantially equal to the width dimension Wz. The lower flanges 70a and 70b are constructed symmetrically with the upper flanges 70a and 70b in the upper-lower direction.

The crush box 50 thus constructed is disposed between the side member 12R and the bumper beam 10 in the following posture. Specifically, the pair of narrow side walls 66 are located at the both end areas in the upper-lower direction of the vehicle, and in the section perpendicular to the axis of a main body portion 52, the narrow side walls 66 and the flanges 68 are substantially parallel to the vehicle width direction.

According to this crash box 50, outside of (in the upper-lower direction) the pair of narrow side walls 66, the flanges 68 (the wing-like flanges 70a and 70b) are respectively provided. Each of the flanges 68 is connected to each of the narrow side walls 66 at the central portion thereof. The both lateral portions (wing-like flanges 70a and 70b) of each of the flanges 68 are projected outward in directions away from the tubular portion, and are bent so as to spread parallel to the narrow side wall 66 in the opposite directions relative to each other. As a result, the concave groove-like shapes as a whole are formed outside of the tubular portion where the narrow side walls 66 form the bottom portions. Therefore, even when the impact load applied to the crash box 50 in the oblique direction of the vehicle and generates the moment load, owing to disposition of the flanges 68, the crush box 50 is suppressed from the lateral falling to render the excellent impact absorbing performance stably.

Figure 2A:
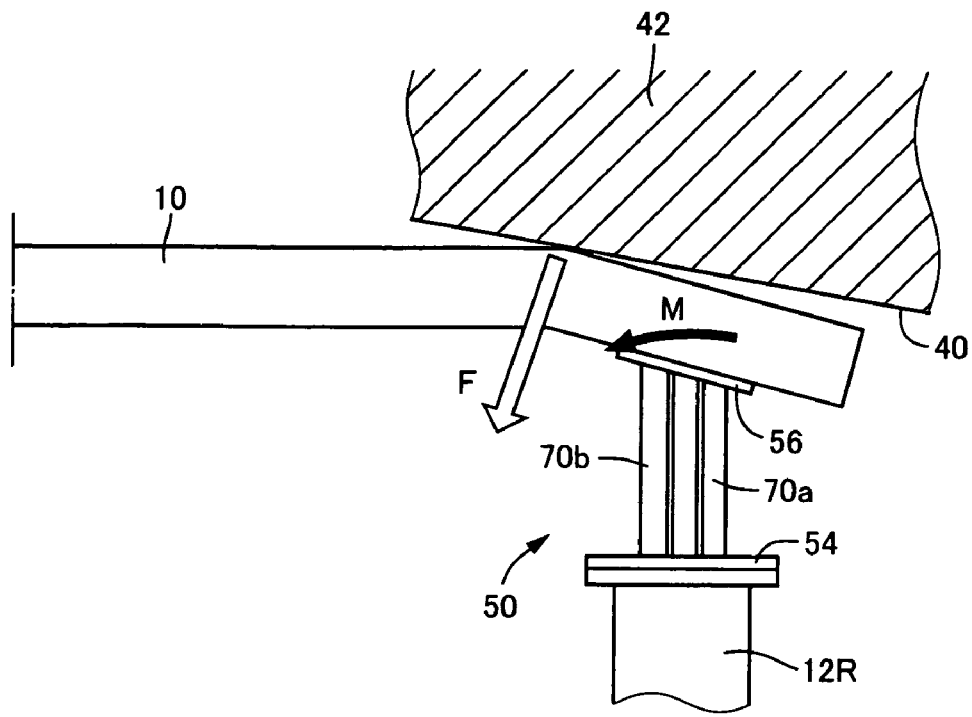
Figure 8A:
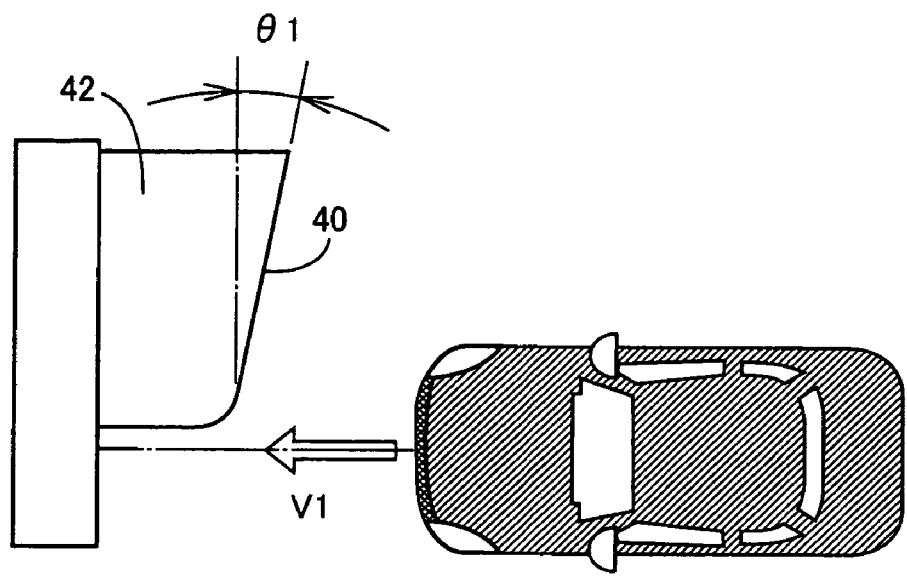
FIGS. 8A and 8B are views explaining crash tests supposing collisions to a vehicle from an oblique direction, in which FIG. 8A explains a crash test wherein a vehicle is crashed to a rigid barrier having a crash surface inclined at a predetermined angle θ1, and FIG. 8B explains a crash test wherein a crash cart is crashed into a vehicle in a direction inclined at a predetermined angle θ2.
Figure 8B:
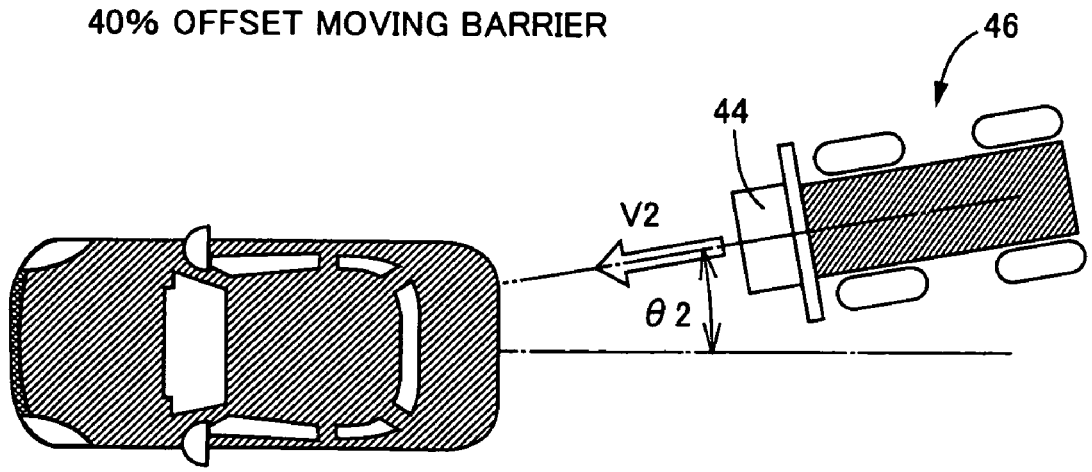
Figure 9:
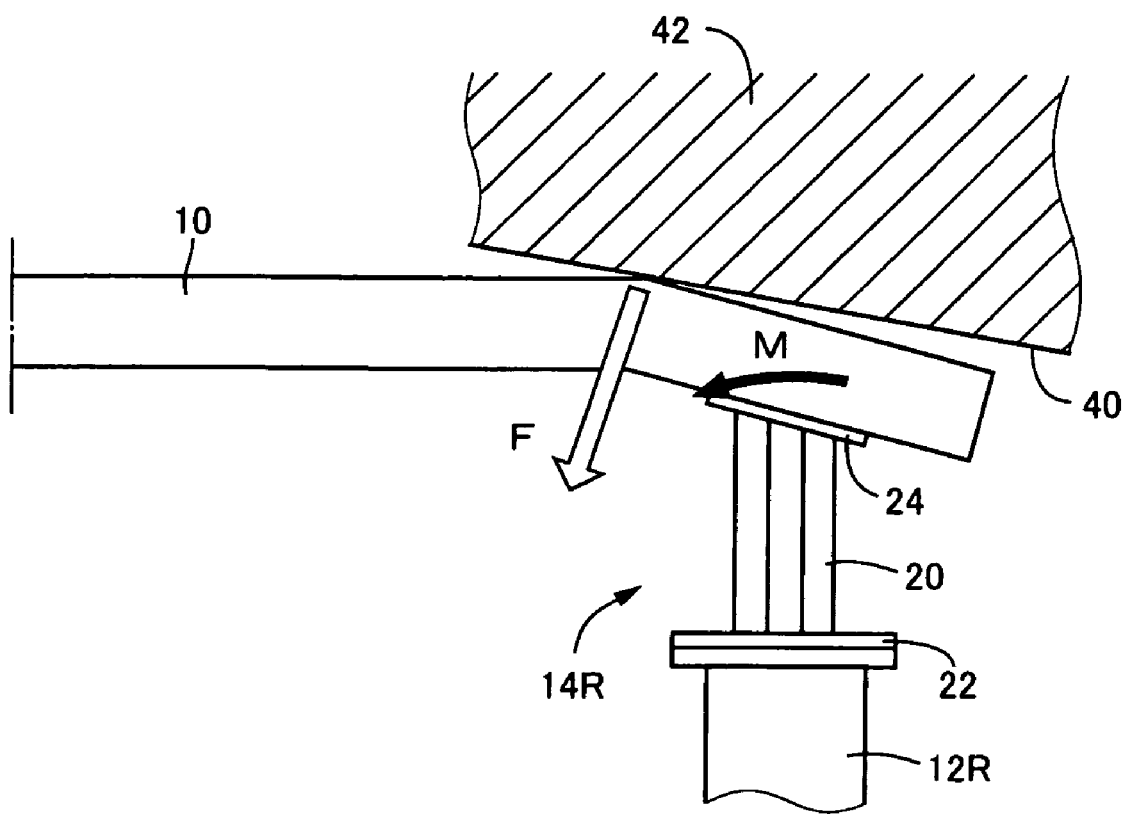
FIG. 9 is a view explaining a moment load applied to the impact absorbing member for the vehicle in the crash test of FIG. 8A.

For example, FIG. 2A shows, in a crash test using a rigid barrier 42 shown in FIG. 8A, the inclined crash surface 40 applies the load F obliquely to the crash box 50. In this case, a moment load M directed toward the vehicle inner side (a counterclockwise direction in FIG. 2A) is generated on the crash box 50. However, owing to disposition of the flanges 68 (the wing-like flanges 70*a* and 70*b*) extending in the vehicle width direction, the crash box 50 is effectively suppressed from the lateral falling.

Figure 2B:
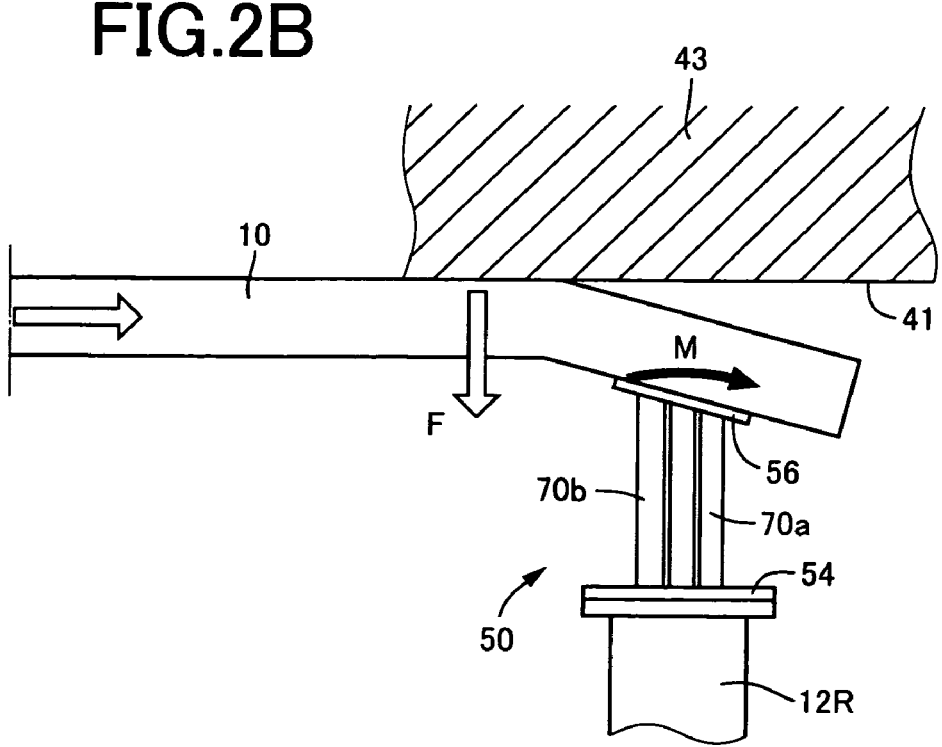

On the other hand, FIG. 2B shows a crash test using a conventional rigid barrier 43 having a crash surface 41 perpendicular to the crash direction. Even in this case, the bended portion of the bumper beam 10 may be expanded or stretched depending on the shape, strength, or the like thereof, so that an outward moment load M directed in an inverse direction, i.e., a direction toward the vehicle outer side (a clockwise direction in FIG. 2B) may be generated. Even upon generation of such clockwise moment load M, owing to disposition of the flanges 68 (the wing-like flanges 70*a* and 70*b*) extending in the vehicle width direction, the lateral falling of the crash box 50 can be effectively suppressed.

Figure 3A:
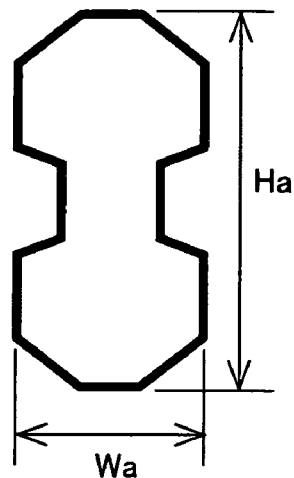
FIGS. 3A to 3C are views explaining sectional shapes of three shape models set for FEM analysis of impact absorbing performance.
Figure 3B:
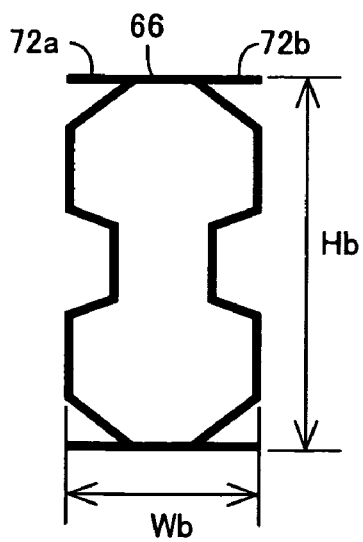
Figure 3C:
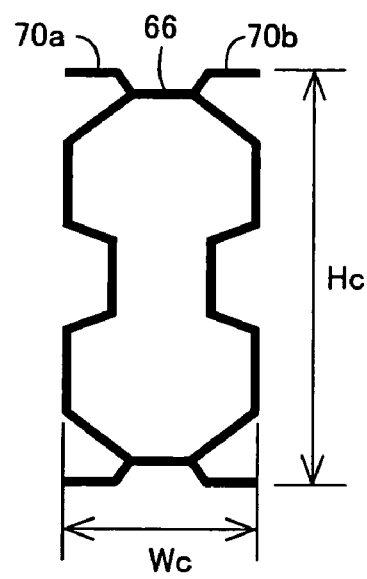
Figure 4A:
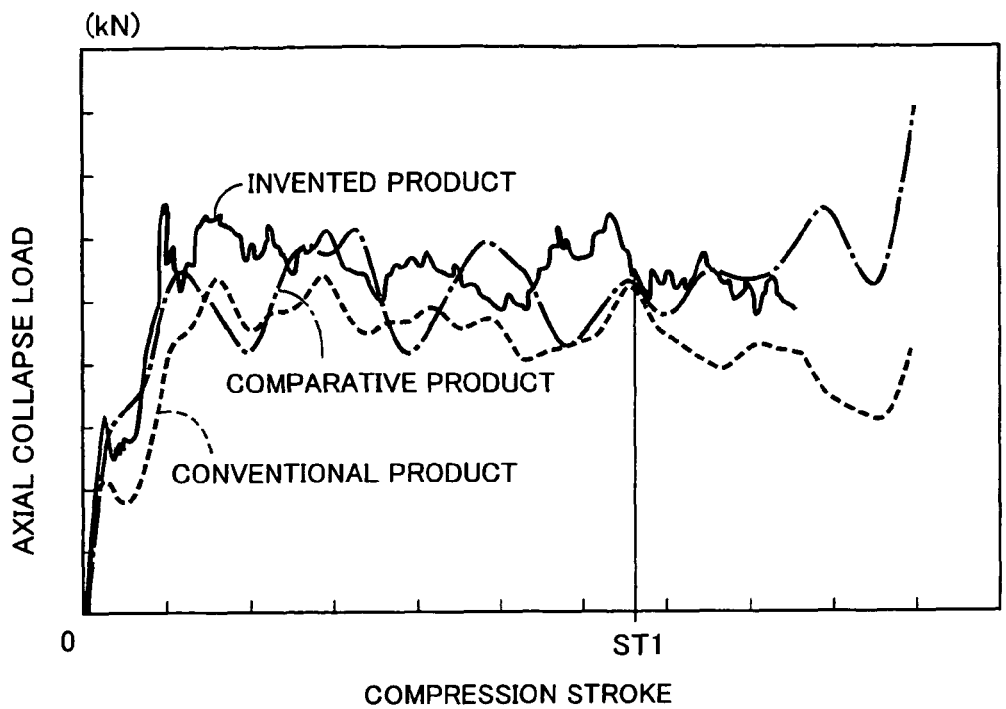
FIGS. 4A and 4B are views showing change characteristics in axial collapse load and absorbed energy in response to compression stroke, obtained by FEM analysis.
Figure 4B:
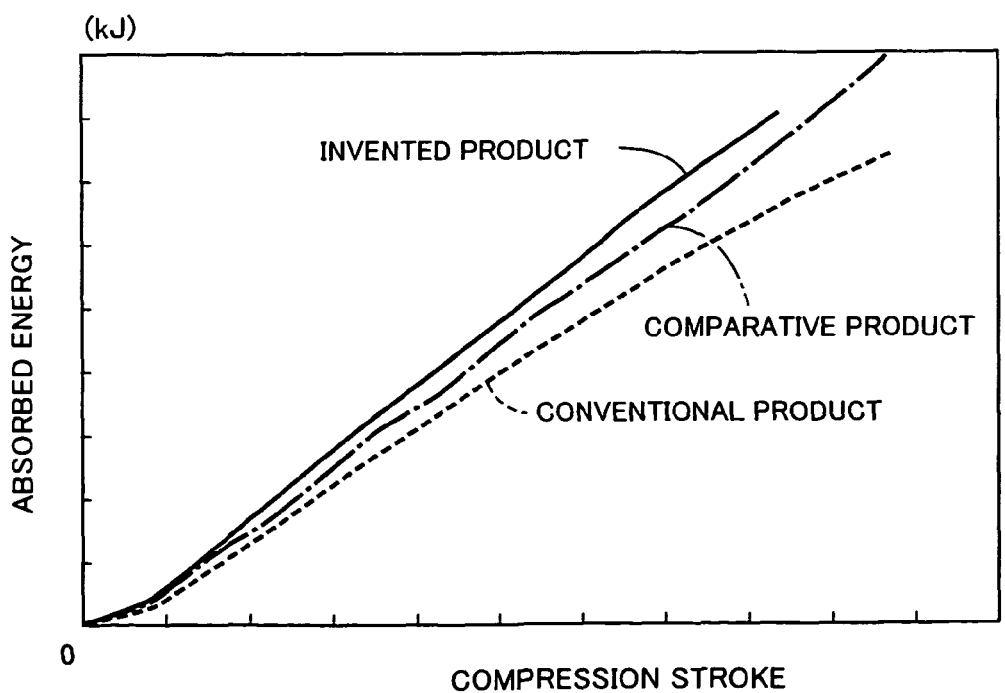

A crash test is simulated for three kinds of shape models using 40% offset rigid barrier shown in FIG. 8A under the conditions of angle $\theta1=12°$ and vehicle speed $V1=15$ km/h, and the collapse process in the crash test is simulated by the FEM analysis. The axial collapse load characteristic and the absorbed energy characteristic in response to the compression stroke are calculated, result of which are shown in FIGS. 3 and 4. In FIG. 3 explaining the sectional shape of the three kinds of shape models, FIG. 3A shows the shape of a conventional product in which no wing-like flanges 70*a* and 70*b* are provided in the crush box 50 similar to the above embodiment. FIG. 3B shows the shape of a comparative product in which a pair of straight flanges 72*a* and 72*b* extending in the left-right direction straightly from the narrow side wall 66 are provided, instead for the wing-like flanges 70*a* and 70*b*, in the crush box 50 similar to the above embodiment. FIG. 3C shows the shape of the invented product similar to the crash box 50 of the above embodiment.

In any cases, the shape and the dimension of the tubular portion with the closed section are the same and equal. The length dimension in the axial direction (dimension in the direction perpendicular to the sheet of FIG. 3) is selected to be 200 mm, and the width dimension of the section of the tubular portion Wa (corresponding to the width dimension Wz) is selected to be 67 mm which is equal to Wb and Wc (Wa=Wb=Wc). In contrast with the height dimension Ha=Hb=129 mm of the conventional product and the comparative product, the height dimension Hc of the invented product is selected to be 135 mm, which is larger by the height dimension of the wing-like flanges 70*a* and 70*b* provided to extend in the upper-lower direction.

The pair of straight flanges 72*a* and 72*b* of the comparative product FIG. 3B and the pair of wing-like flanges 70*a* and 70*b* of the invented product FIG. 3C are provided such that the dimensions between the outer ends are approximately equal to the width dimensions Wb and Wc, respectively.

In FIG. 4 showing changes in the axial collapse load and the absorbed energy in response to the compression stroke, a solid line represents the invented product, a dashed dotted line represents a comparative product, and a dashed line represents a conventional product. With the conventional product, around ST1 in the second half of compression stroke, behavior of the lateral falling occurs to degrade the energy-absorbing performance. Although the comparative product is suppressed from the lateral falling owing to disposition of the straight flanges 72*a* and 72*b*, the axial collapse characteristic inherent to the conventional product with no flange is inhibited. As a result, the wavelength and amplitude of the axial collapse load increase, so that the excellent energy-absorbing performance can be hardly obtained. This results from the increased buckling wavelength at the straight flanges 72*a* and 72*b* provided to protrude straightly from the narrow side walls 66.

Meanwhile, the invented product is suppressed from the lateral falling during the axial collapse. Further, with the invented product, the wavelength and amplitude in the axial collapse load decreases according to the collapses occurred closely in a short wavelength, so that the excellent energy-absorbing performance can be obtained. This is because the axial collapse characteristic inherent to the conventional product with no flange is not inhibited since the buckling wavelength is not increased even by disposition of wing-like flanges 70*a* and 70*b* on the flanges 68.

In the present embodiment, the both lateral portions (the wing-like flanges 70*a* and 70*b*) of the flange 68 are formed to spread parallel to the narrow side walls 66 respectively. Therefore, as compared with the case in which the flanges are provided to project radially outward, the crash box can be constructed compact with appropriately suppressing the lateral falling resulted from the impact load applied in the oblique direction of the vehicle. Then mountability of the impact absorbing member on the vehicle is improved.

Further, in the present embodiment, the width dimension of each of the flanges 68 in the section perpendicular to the axis of the main body portion 52, i.e., the width dimension Wx between the outer ends of the long portions 74*a* and 74*b* of the pair of wing-like flanges 70*a* and 70*b*, is selected to be equal to or less than the width dimension Wz between the outer surfaces of the main body portion 52 in the direction parallel to the narrow side walls 66. Therefore, the width dimension of the main body portion 52, i.e., the dimension in the vehicle width direction, can be maintained substantially equal to that of the conventional product. As a result, the lateral falling resulted from the impact load applied in the oblique direction of the vehicle is appropriately suppressed, so that the impact absorbing performance of the impact absorbing member can be improved, without impairing the mountability thereof on the vehicle.

Further, in the present embodiment, the flanges 68 are formed integrally with the main body portion 52, so that the central portion of each of the flanges 68 is shared with each of the narrow side walls 66. Further, each of the narrow side walls 66 is designed to have thickness equal to that of the other side walls 60 and 64. Then a decrease or decline in the impact absorbing performance resulting from a local increase in thickness or plate thickness is suppressed. In addition, because thickness of the parts of the main body portion 52 including the flanges 68 is substantially constant, the moldability upon the integral molding of the main body portion 52 with the flanges 68 by the extrusion molding of the aluminum alloy, can be maintained excellently.

<Other Embodiments>

It is noted that integrally forming the main body portion 52 including the flanges 68 by the extrusion molding of the aluminum alloy as the above embodiment is not essential. For example, as shown in FIG. 5A and FIG. 5B, the flanges 80 and 90 forming the concave groove-like shape as a whole the bottom by the narrow side wall 66 may be formed as separate or independent parts from the tubular portions 82 and 92 with the closed section, that is, may be formed of different members. Such separate flanges 80 and 90 are integrally fixed to the tubular portions 82 and 92 by fixing means such as welding, soldering, or the like.

More specifically, the tubular portion 82 in FIG. 5A is formed by the extrusion molding, similar to the main body portion 52 of the above embodiment. The flanges 80 are integrally fixed to the tubular portion 82 to form a main body portion 97. A tubular portion 92 in FIG. 5B comprises a pair of pressed plates 94 and 96 bent into an M shape to form a concave grooves 62 therein. The tubular portion 92 of a polygonal tubular shape having a sectional shape elongated in upper-lower direction is formed by superposing the both side edges of the pair of press plates 94 and 96, i.e., the portions to serve as the narrow side walls 66, and being weld-fixed integrally. The flanges 90 are integrally fixed to the tubular portion 92 to form a main body portion 98.

In the above, some embodiments of the present invention are explained in detail based on the drawings, but noted that these are just illustrative embodiments of the present invention. The present invention can be carried out in various modes in which modifications and improvements are added based on the knowledge of those skilled in the art.

What is claimed is:

1. An impact absorbing member for a vehicle disposed between a vehicle body side member and a bumper member in a posture such that an axial direction of the impact absorbing member is directed in a fore and aft direction of the vehicle, and collapsed like bellows axially upon receipt of a compressive load to absorb an impact energy, the impact absorbing member comprising:
   a tubular body portion with a closed section constructed of a plurality of plate-shaped side walls;
   at least one concave groove provided in at least one of the side walls, recessed inwardly and extended parallel to an axial direction of the tubular body portion;
   reinforcing side walls respectively formed by a pair of parallel side walls which are other than the at least one side wall of the plurality of plate-shaped side walls provided with the at least one concave groove, and which are symmetrically located in the closed section; and
   flanges integrally formed on the tubular body portion over an entire axial length thereof respectively outside of the pair of reinforcing side walls, each of the flanges including, in a section perpendicular to the axial direction of the tubular body portion, a central portion and a pair of lateral portions, the central portion being connected to the reinforcing side wall, and the lateral portions projecting outward in directions away from the tubular body portion and being bent to spread substantially parallel to the reinforcing side wall in opposite directions, to form a shape of a concave groove as a whole having a bottom portion at a side of the reinforcing side wall outside of the tubular body portion.

2. The impact absorbing member for the vehicle according to claim 1, wherein, in the section perpendicular to the axial direction of the tubular body portion, a width dimension between the both ends of each of the flanges is equal to or less than a width dimension between the outer surfaces of the tubular body portion in a direction parallel to each of the reinforcing side walls.

3. The impact absorbing member for the vehicle according to claim 1, wherein the flanges are formed integrally with the tubular body portion, and the central portion of each of the flanges is shared by each of the reinforcing side walls of the tubular body portion.

4. The impact absorbing member for the vehicle according to claim 1, wherein the impact absorbing member is disposed in a posture such that the pair of reinforcing side walls are located in both end areas in a vehicle upper-lower direction, and the reinforcing side walls and the flanges are substantially parallel to the vehicle width direction in the section perpendicular to the axis of the tubular body portion.

5. An impact absorbing member for a vehicle disposed between a vehicle body side member and a bumper member in a posture such that an axial direction of the impact absorbing member is directed in a fore and aft direction of the vehicle, and collapsed like bellows axially upon receipt of a compressive load to absorb an impact energy, the impact absorbing member comprising:
   a tubular body portion with a closed section forming an elongate shape and having a pair of parallel long sides;
   a pair of wide side walls provided with the long sides of the elongate shape;
   at least one concave groove provided in at least one of the wide side walls, recessed inwardly and extended parallel to an axial direction of the tubular body portion;
   reinforcing side walls formed by a pair of narrow side walls of the tubular body portion which are located in both end areas in a longitudinal direction of the closed section and are perpendicular to the longitudinal direction; and
   flanges integrally formed with the tubular body portion over an entire axial length thereof respectively outside of the pair of reinforcing side walls, each of the flanges including, in a section perpendicular to the axial direction of the tubular body portion, a central portion and a pair of lateral portions, the central portion being connected to the reinforcing side wall, and the lateral portions projecting outward in directions away from the tubular body portion and being bent to spread substantially parallel to the reinforcing side wall in opposite directions, to form a shape of a concave groove as a whole having a bottom portion at a side of the reinforcing side wall outside of the tubular body portion.

6. The impact absorbing member for the vehicle according to claim 5, wherein, in the section perpendicular to the axial direction of the tubular body portion, a width dimension between the both ends of each of the flanges is equal to or less than a width dimension between the outer surfaces of the tubular body portion in a direction parallel to each of the reinforcing side walls.

7. The impact absorbing member for the vehicle according to claim 5, wherein the flanges are formed integrally with the tubular body portion, and the central portion of each of the flanges is shared by each of the reinforcing side walls of the tubular body portion.

8. The impact absorbing member for the vehicle according to claim 5, wherein the impact absorbing member is disposed in a posture such that the pair of reinforcing side walls are located in both end areas in a vehicle upper-lower direction, and the reinforcing side walls and the flanges are substantially parallel to the vehicle width direction in the section perpendicular to the axis of the tubular body portion.

* * * * *